Oct. 10, 1961 — E. L. ARMENTROUT — 3,003,278
MINNOW TRAP
Filed Dec. 31, 1959 — 2 Sheets-Sheet 2
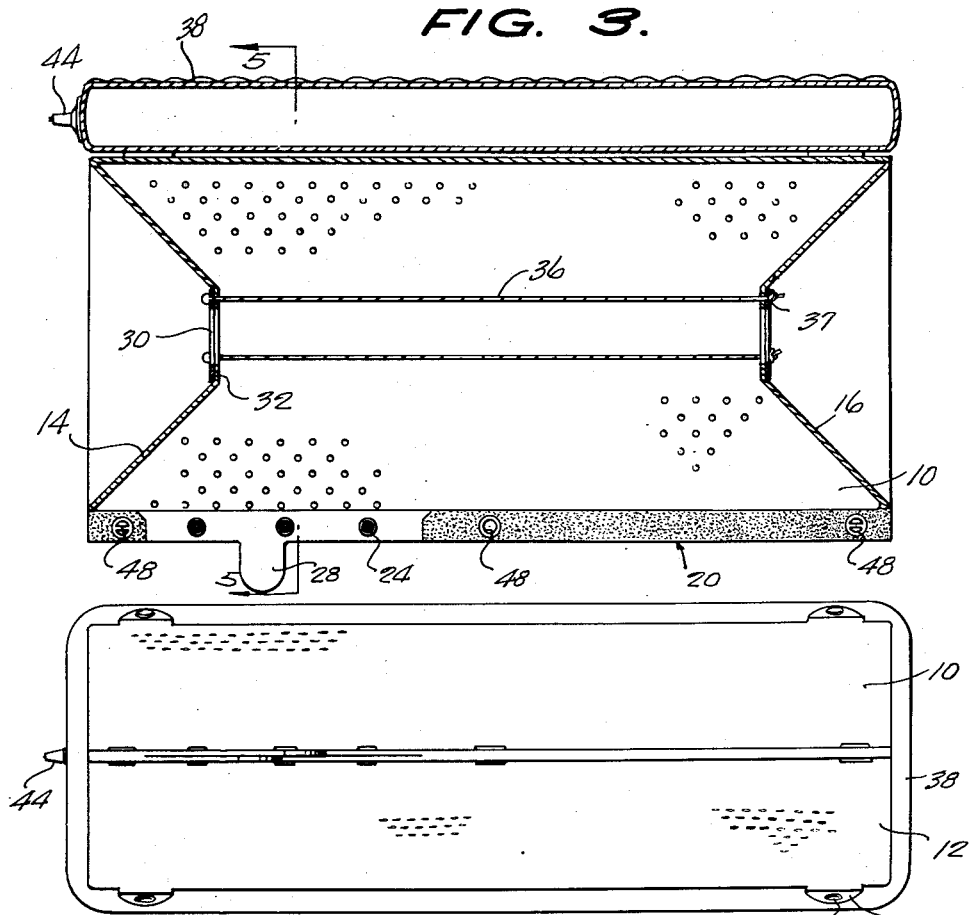
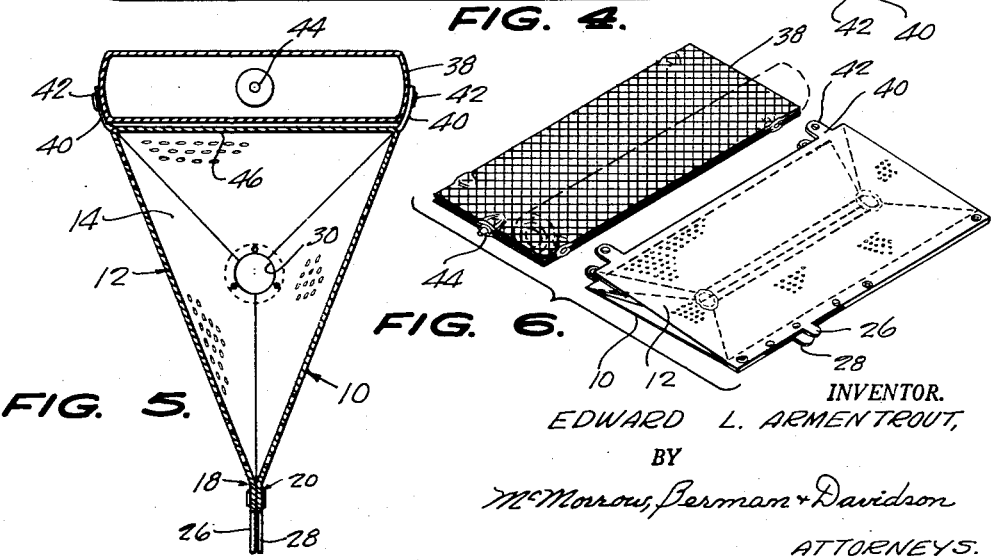
INVENTOR.
EDWARD L. ARMENTROUT,
BY
McMorrow, Berman & Davidson
ATTORNEYS.

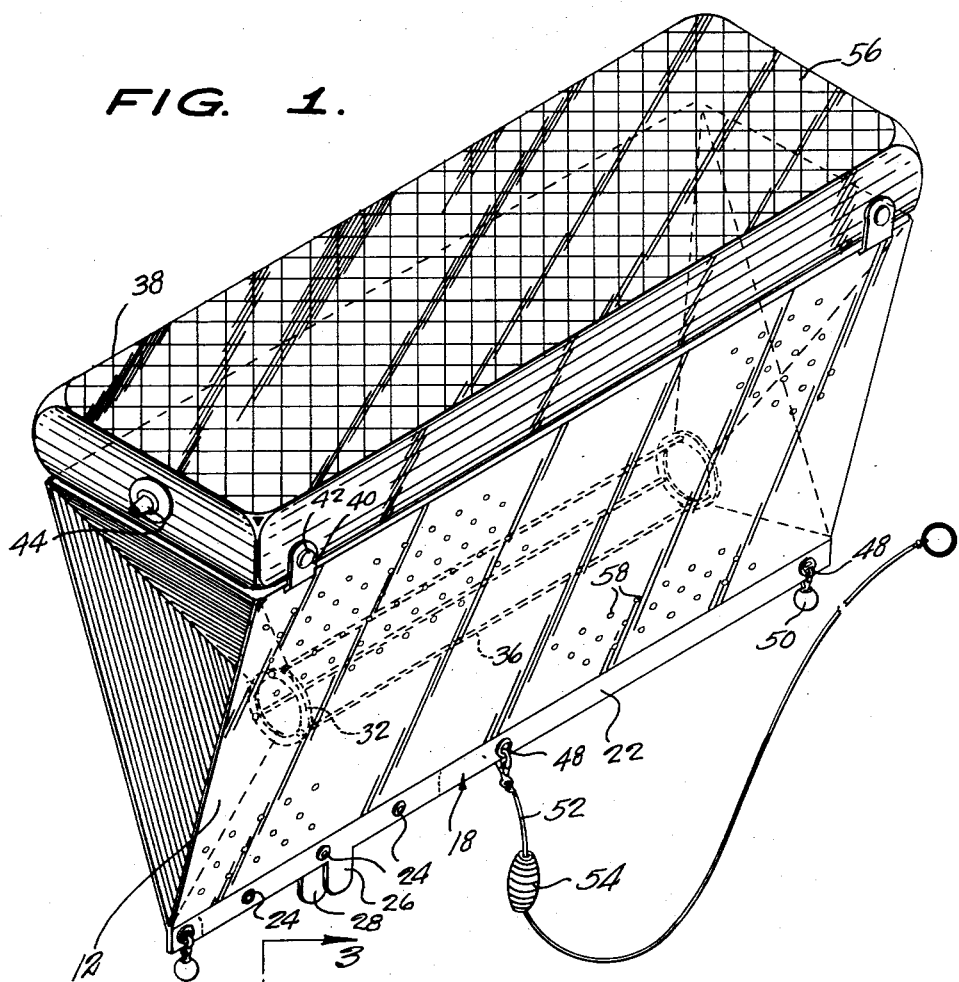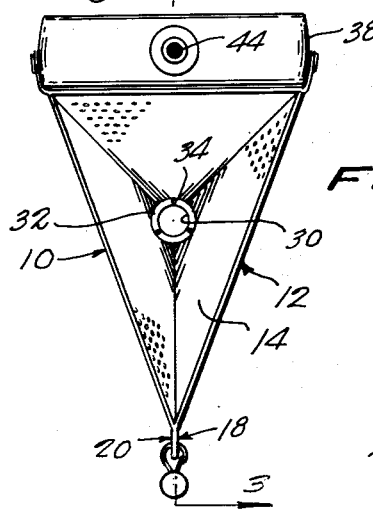

United States Patent Office 3,003,278
Patented Oct. 10, 1961

3,003,278
MINNOW TRAP
Edward L. Armentrout, 321 S. 1st St., Hampton, Va., assignor of one-third to Henry L. Mead, Bartlett, N.H., and one-third to Louis A. Barre III, Shreveport, La.
Filed Dec. 31, 1959, Ser. No. 863,167
2 Claims. (Cl. 43—103)

The present invention relates to a minnow trap.

Previously proposed and presently in use are traps for minnows or fingerling fish, intended for the capture of minnows or fingerling fish for use as bait. Ordinarily, the traps proposed or commercially available are constructed of more or less rigid material such as sheet metal, wire mesh, glass, or the like. In brief, the traps proposed or commercially available generally are elongated, have inwardly turned end walls, each provided with an opening. The end wall at each end of such a trap is conical, pyramidal, or truncated, and normally has the opening at the apex thereof. It has been experienced that a minnow or fingerling fish, upon entering the trap through such opening, is confused by the configuration of the trap end wall and is unable to escape from the trap. Such traps as have been proposed or are commercially available have certain disadvantages or defects. A principal defect lies in the bulkiness of such a trap. Although attempts have been made to avoid bulkiness, by making the traps collapsible, or constructed in such a manner as to lend itself to ready disassembly, the traps previously provided have not met with commercial success.

Additionally, traps constructed of sheet metal or wire mesh are highly susceptible to damage as the result of immersion in salt water or fresh water, are frequently rendered inoperative due to bulk weight of the trap causing said trap to sink excessively deep into mud bottom, thus blocking minnow entrances; are damaged or lost through encounter with bottom obstructions or colonies of crustacean life, to the detriment of the trap; the effectiveness of bottom placement during operation being lessened or nullified through the presence or hostile actions of bottom feeding crustaceans or fish congregating near and attempting to gain entry into the trap interior to obtain bait contained therein, thus frightening minnows from the immediate area and minimizing their entrapment; are generally constructed in a manner requiring partial or total disassembly of components during bait insertion or minnow removal operations; are not normally field reparable when damaged, thus wasting time and motion economy of the user.

An object of the present invention is to provide a minnow trap which lends itself to ready storage in a collapsed condition, requiring very small storage area in a tackle box, pocket or elsewhere; which lends itself to erection from the collapsed condition to a condition of use with ease and facility; which is relatively indestructible for use in either salt or fresh water, rustproof and corrosion resistant construction; which is not easily damaged by engagement with underwater obstructions; which is not rendered inoperative by mud or other foreign matter blocking minnow entrances, or by the close proximity of colonies of bottom dwelling or feeding crustaceans or fish, which tend to frighten minnows away from the trap; and one which is highly effective in action.

Another object of the present invention is to provide a minnow trap which has means for providing ready access to the trap interior without necessity for any disassembly of trap components for the purpose of placing bait therein or removing entrapped minnows therefrom; one which may have totally transparent trap sides permitting minnows an unobstructed view of bait contents on the trap interior; and one which is economically feasible.

A further object of the present invention is to provide a minnow trap having a detachable buoyant body, which lends itself for use as a boat cushion or even as a life preserver when detached therefrom; is easily and expediently field reparable by conventional methods and using conventional materials when damaged or punctured.

These and other objects and advantages of the present invention will be fully apparent from the following description when taken in conjunction with the annexed drawings, in which:

FIGURE 1 is an isometric view of the minnow trap of the present invention;

FIGURE 2 is an end view of the assembly shown in FIGURE 1;

FIGURE 3 is a view taken on the line 3—3 of FIGURE 2;

FIGURE 4 is a bottom plan view;

FIGURE 5 is a view taken on the line 5—5 of FIGURE 3; and

FIGURE 6 is an exploded isometric view showing the minnow trap and float body in collapsed condition, the dotted line showing indicating a rolled up position of the float body.

Referring in greater detail to the drawings in which like numerals indicate like parts throughout the several views, the minnow trap of the present invention comprises a randomly perforated back panel 10 arranged in an upwardly sloping direction, a randomly perforated front panel 12 arranged in an upwardly oppositely sloping direction positioned in face to face relation with respect to the back panel 10, and upstanding flexible randomly perforated end panels 14 and 16 disposed inwardly of and adjacent the complemental ends of the front panel 12 and back panel 10 and connecting the back panel 10 and front panel 12 together.

The front panel 12 has the lower edge portion thereof extending along and abutting the lower edge portion of the back panel 10, such portions being designated by the numerals 18 and 20, respectively.

The front panel 12 has the upper edge portion outwardly of and in substantial alignment with and spaced from the upper edge of the back panel 10, as shown in FIGURES 1, 2, and 5.

Means is provided securing the lower edge portions 18 and 20 of the front and back panels 12 and 10 together, respectively, such means fixedly securing the portions 18 and 20 from one of the complemental ends of the front panel 12 and back panel 10 to a point adjacent to and spaced from the other of the complemental ends of the front panel 12 and the back panel 10. The fixedly secured part of the lower edge portions is designated in FIGURE 1 by the reference numeral 22. The remainder parts of the lower edge portions are detachably secured together by snap fasteners 24. It is to be understood that other fastening means may be employed in place of the snap fasteners 24.

The unsecured parts of the panel portions 18 and 20 are provided with depending tabs 26 and 28 arranged in offset relation, the tab 26 depending from the lower edge portion of the front panel 12 and the tab 28 depending from the lower edge portion of the back panel 10. The tabs 26 and 28 form grip means for the application of a manually applied spreading force to the unsecured parts of the lower edge portions 18 and 20 for spreading the latter to provide an access opening into the trap of the present invention.

The end panels 14 and 16 have openings therethrough, the openings being in substantial alignment with each other. In FIGURE 2, one of such openings is designated generally by the reference numeral 30. As the end panels 14 and 16 are identical, the end panel 14 will be described in detail and it will be understood that the description will apply equally to the end panel 16.

The perimeter of the opening 30 is reinforced by a ring 32 having spaced apertures 34 therein, as shown in FIGURE 2. The apertures 34 of one ring 32 are in alignment with the apertures 34 of the ring 32 in the opposed end wall 16. A flexible tie means or length of cord 36 extends between the aligned apertures 34 in the rings 32 and is provided with a knot 37 on each end exteriorly of the adjacent ring 32. The cords 36 constitute means for holding the end panels 14 and 16 in position within the confines of the back and front panels 10 and 12, respectively.

It is to be understood that in place of the cords 36 any flexible strand may be employed and any material used which is found practical.

The present invention provides inflatable means extending over the upper ends of the front panel 12, back panel 10 and the end panels 14 and 16. Such inflatable means in a preferred form embodies a flexible bag 38 conformably shaped to fit over the upper ends of the panels and superimposed upon the upper ends of the panels and detachably secured thereto. The means securing the bag 38 to the upper ends of the panels 10 and 12 consist in a plurality of straps 40 and cooperating snap means on the bag 38 and the straps 40, as at 42 in FIGURE 5, although other cooperating attaching means may be employed to secure the bag 38 to the panels 10, 12, and 14 and 16.

Valve means 44 is provided in one end of the bag 38 for inflating the bag orally, that is, by mouth. It is to be understood that placement of the valve means may be positioned at a location other than at the described end position of the bag and, in addition, it will be understood that substitute valve means may instead be incorporated which will permit mechanical inflation, that is, conventional inflation such as an auto tire at a filling station means, or, may permit both oral and mechanical inflation means.

It is to be understood that the minnow trap of the present invention may be constructed with or without a top to the trap, with the bag 38 serving as a top and secured to the upper ends of the panels of the trap. In a preferred form of the invention, the trap is provided with a flexible cover 46, said cover being a material extension of the back panel 10, front panel 12, and end panels 14 and 16, the side and end extensions of said horizontally situated cover dropping downwardly at respective sides and ends thereof to form the back panel 10, and front panel 12 and end panels 14 and 16. It will be apparent that in the embodiment of the invention which is not provided with a trap cover 46, that is, one in which the bottom of the inflatable bag 38 serves as a cover to the trap, both the bag 38 and trap may be formed of a single, one-piece construction, being cut, bent, sealed and materially augmented to provide the desired configuration. In the two-piece design of the invention, the trap may also be formed of one-piece construction, as may be the inflatable bag.

Means is provided by the present invention on the front and back panels 12 and 10, respectively, for attachment thereto of anchoring and ballast members. Specifically, such means consists in a plurality of eye formations or grommets 48 provided inwardly of each end of the trap and at an intermediate part of the trap, as shown in FIGURE 3. It will be understood that any type of reinforcement means necessary to prevent tearing or ripping of trap surfaces around said grommets 48, may be provided without detracting from the purpose and scope of the invention.

Ballast weights 50 may be attached to the end grommets for purposes of exerting downward pressure or stress on the respective flexible sides at corners of the trap to maintain the flexible sides and end panels of the trap in the desired vertical posture and the keel 22 in the desired horizontal posture. A cord 52 may be attached to the center grommet, as shown in FIGURE 1, the cord 52 accommodating itself to the support of a sliding weight 54 thereon for purposes of anchoring the trap of the present invention in a comparatively shallow and quiet body of water. It will be apparent that the sliding line anchor 54 will be of no value when the invention is being utilized in deep water, as from a boat for instance, and said cord 52 would normally be unsnapped from the center grommet in such instance, the sliding line anchor 54 would be removed therefrom and the cord 52 would then be attached as in FIGURE 1, except through either of the end grommets provided for ballast weights 50, together with such ballast weights 50. In this manner, the trap would drift freely in the direction of outgoing tides or currents, and would not be susceptible to upset or posture disturbance as would be apparent were said line attached to the center grommet as in shallow water usage.

In a preferred embodiment of the present invention, the trap is constructed of flexible transparent material such as plastic or the like, and the bag 38 may be similarly constructed of a suitable flexible material, either transparent or opaque, such as plastic, rubber or the like, with all attachments such as eyelets, snaps, etc., to the trap or bag 38, being of rustproof or rustproofed construction or material. It will be understood that the trap and bag, respectively, may be constructed of identical material, either transparent or opaque or a combination thereof, of flexible material such as plastic, rubber or the like.

In the preferred form of the invention, the top panel of the bag 38 is quilted, as at 56 in FIGURE 1, in order to provide an attractive appearance to the top of the bag and also a more or less non-slip surface when the bag 38 is removed from the minnow trap and used as a seat cushion in a boat or elsewhere as desired. In addition, the bag 38 may be separated interiorly by panelization, that is, separate tubes or compartments enjoined at various positions, this providing greater resistance to collapsibility or bending stresses exerted upon the surfaces of the inflated bag by weight of components suspended thereunder. Further, the top, sides, bottom and other parts of the bag 38 or portions thereof, or the trap, may possess or have attached fixedly thereto devices exhibiting phosphorescent or light holding and emitting qualities, allowing visible control and observance of said device during hours of darkness and serving to attract minnows or fingerling fish to the trap at night by this well known attracting method.

The back and front panels 10 and 12, and end panels 14 and 16, respectively, are provided with perforations 58 which expedite diffusion of bait scents into surrounding water to attract minnows and which permit the flow of water through the trap of the present invention to keep alive therein minnows which may enter through the openings 30 and find themselves trapped therein because of the confusion and shape of the end panels 14 and 16, the entrapment of such minnows and fingerling fish having been observed and experienced in the past; said perforations further assuring expedient spilling of water from the trap interior during and subsequent to retrieve and withdrawal from water, thus reducing stresses upon the trap and components thereof caused by the specific gravity or weight of said water, and allowing expedient and comparatively dry handling of the present invention during minnow removal and bait insertion functions.

In use, the trap of the present invention may be easily and with facility expended from collapsed condition shown in FIGURE 6 to a use condition with the front and back panels diverging away from each other and with the cover 46 extending over the upper ends of the front and pack panels and end panels 14 and 16. The cushion or bag 38, in the preferred embodiment of the invention, is easily attached to and detached from the upper end of the panels 10 and 12 of the trap and may be employed as a seat cushion as desired. In all embodiments, in emergencies, the bag 38, whether attached or detached from the trap, may serve as a life preserver or float apparatus when in the inflated condition. Further, the bag 38, when removably attached to the cord 52, with the sliding line anchor 54 in position around said cord 52, can serve as a floating marker to temporarily pinpoint dragging operations necessary to recover items dropped overboard accidentally for instance, or to mark location of crustacean traps, fish schools, etc.

The weights may be attached to the lower end portions of the panels 10 and 12 on the grommets or eyelets 48 provided, so as to counteract buoyancy of the trap and to maintain equal horizontal posture of the base 22 thereof below water, and the weight 54 may be secured upon the cord 52 at any point desired for anchoring the trap of the present invention in a body of water. The weight 54 may be slid forwardly up the cord 52 to a location near the trap end, in this position, provide ballast required for manual launch of the present invention out, over and into water; said weight 54, upon alighting in water, immediately commencing to slide downwardly over and along the cord 52 until reaching the water's bottom, whereupon said cord 52 may be partially retrieved from short or other position of the operator, until said cord 52 becomes taut upon said weight 54, exerting pressure upon the base of the invention and, in this manner, retaining and maintaining the invention in the desired vertical posture while floating near the water surface and suspended beneath the floating bag 38, even in rough or disturbed waters which would otherwise tend to constantly and continuously distort the trap's flexible posture and therefore reduce susceptibility of minnow entry thereinto.

Due to the arrangement illustrated and described, the minnow trap comprising the present invention serves a variety of purposes and a multiplicity of functions. For example, the device might be made in smaller form for use by children as an educational and recreational toy in the entrapment and study of water life. Not only does it discharge the usual function of entrapment of minnows and fingerling fish but, also, contains provisions enhancing its use and effectiveness during darkness through its light emitting and attracting qualities, serves as an inflatable boat cushion in a boat or elsewhere, serves in emergencies as a life preserver, and may be utilized in the manner described as a marker buoy. In some instances, the device might be made as a single one-piece construction without the trap top 46. In such cases, the bag 38 would not normally be employed as a seat cushion, however, the device could still function effectively as a marker buoy, float, or even as a life preserver in emergency, and there could, of course, be other possible variations.

It is also to be noted that the device could be made of various materials, and in addition its particular configuration could be varied, so that it does not have the exact shape and appearance illustrated by way of example. In every instance, the device has the basic principles of the invention, even though individual elements of the invention may be combined in a single one-piece construction or separated, or omitted in the various allowable commercial embodiments.

Suitably dimensioned plugs or stoppers (not shown) may be employed to close the ingress openings 30 in the end panels 14 and 16 when it is desired to convert the trap to a floating storage facility for the entrapped bait minnows or other live bait.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is.

1. A minnow trap comprising a flexible back panel arranged in an upwardly sloping direction, a flexible front panel arranged in an upwardly oppositely sloping direction positioned in face to face relation with respect to said back panel and having the lower edge portion extending along and abutting the lower edge portion of said back panel and having the upper edge portion outwardly of and in substantial alignment with and spaced from the upper edge of said back panel, the lower edge portions of said front and back panels being fixedly secured together from one of the complemental ends of said front and back panels to a point adjacent to and spaced from the other of the complemental ends of said front and back panels, means detachably securing together the unsecured parts of said lower edge portions of said front and back panels, an upstanding flexible end panel disposed inwardly of and adjacent each of the complemental ends of said front and back panels and secured to said front and back panels, there being an ingress opening in each of said end panels, means for holding said end panels in position within the confines of said front and back panels, and inflatable means extending over the upper ends of said front, back, and end panels and attached to said panels.

2. A minnow trap comprising a flexible back panel arranged in an upwardly sloping direction, a flexible front panel arranged in an upwardly oppositely sloping direction positioned in face to face relation with respect to said back panel and having the lower edge portion extending along and abutting the lower edge portion of said back panel and having the upper edge portion outgardly of and in substantial alignment with and spaced from the upper edge of said back panel, the lower edge portions of said front and back panels being fixedly secured together from one of the complemental ends of said front and back panels to a point adjacent to and spaced from the other of the complemental ends of said front and back panels, means embodying snap fasteners detachably securing together the unsecured parts of said lower edge portions of said front and back panels, a tab depending from said back panel unsecured lower edge portion part, another tab depending from said front panel unsecured lower edge portion part, said tabs being in offset relation and forming grip means for manually spreading said parts to provide an access opening, an upstanding flexible end panel disposed inwardly of and adjacent each of the complemental ends of said front and back panels and secured to said front and back panels, there being an ingress opening in each of said end panels, said openings being in substantial alignment, means for holding said end panels in position within the confines of said front and back panels, and inflatable means extending over the upper ends of said front, back, and end panels and attached to said panels.

References Cited in the file of this patent

UNITED STATES PATENTS

| | | |
|---|---|---|
| 850,123 | Algate | Apr. 16, 1907 |
| 893,943 | Sellman | July 21, 1908 |
| 1,054,561 | Kennedy | Feb. 25, 1913 |
| 2,241,314 | Mohler | May 6, 1941 |
| 2,769,274 | Ougland | Nov. 6, 1956 |
| 2,910,801 | Safarik et al. | Nov. 3, 1959 |